United States Patent [19]

Uitvlugt

[11] 4,222,354
[45] Sep. 16, 1980

[54] VALVE DISABLER

[75] Inventor: Martin W. Uitvlugt, Battle Creek, Mich.

[73] Assignee: Eaton Corporation, Cleveland, Ohio

[21] Appl. No.: 671,760

[22] Filed: Mar. 30, 1976

[51] Int. Cl.³ .......................... F02D 13/06; F01L 1/18
[52] U.S. Cl. .............................. 123/90.16; 123/90.43; 123/198 F
[58] Field of Search .............. 123/198 F, 90.15, 90.16, 123/90.23, 90.32, 90.41, 90.43, 90.47

[56] References Cited

U.S. PATENT DOCUMENTS

| | | | |
|---|---|---|---|
| 1,797,105 | 3/1931 | Shoblom | 123/90.41 |
| 1,930,568 | 10/1933 | Short | 123/90.43 |
| 2,808,818 | 10/1957 | Sampietro | 123/90.43 |
| 2,853,984 | 9/1958 | Sampietro | 123/90.43 |
| 2,863,430 | 12/1958 | Sampietro | 123/90.43 |
| 3,009,450 | 11/1961 | Engemann | 123/90.43 |
| 3,147,745 | 9/1964 | Kilgore | 123/90.43 |
| 3,169,515 | 2/1965 | Kilgore et al. | 123/90.43 |
| 3,422,803 | 1/1969 | Stivender | 123/90.16 |
| 3,470,857 | 10/1969 | Stivender | 123/90.43 |
| 3,964,455 | 6/1976 | Brown | 123/90.16 |

*Primary Examiner*—Ira S. Lazarus

*Attorney, Agent, or Firm*—R. J. McCloskey; D. Wood; P. Rulon

[57] ABSTRACT

An improved valve selector assembly for selectively enabling and disabling the intake and exhaust valves of one cylinder of an internal combustion engine of the type having individually pivoted rocker arms for opening and closing the valves. Each selector assembly includes two valve disablers (one associated with the intake valve rocker arm and one associated with the exhaust valve rocker arm), and control means for orienting and switching the disablers between valve enabling and valve disabling. Each valve disabler is a spring capsule subassembly of the selector assembly and includes a slideable sleeve defining a fulcrum at one end, a cap slideably connected to the other end of the sleeve, and a spring reacting against the cap and biasing the fulcrum into engagement with its respective rocker arm. The control means includes a rotatable latch plate associated with each valve disabler, a solenoid actuator linkage means connecting the latch plates together and to the actuator, a fixed stop orienting one disabler with respect to its associated latch plate, an adjustable stop orienting the other disabler with respect to its latch plate, and torsion springs for biasing the latch plates to their valve enabling position.

15 Claims, 5 Drawing Figures

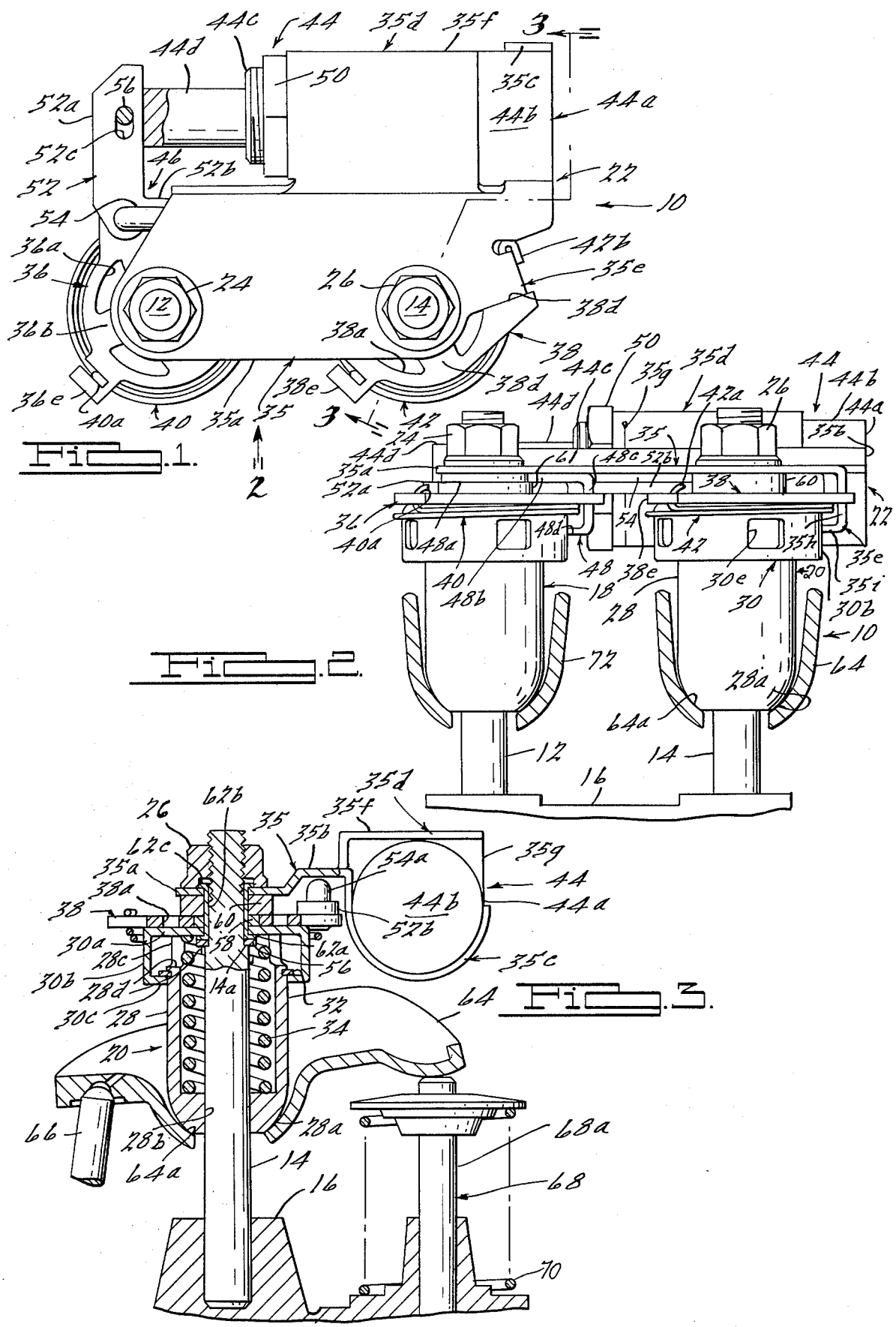

VALVE DISABLER

BACKGROUND OF THE INVENTION

Cross-references

This application relates to copending applications Ser. Nos. 578,295, filed May 15, 1975 and 610,718 and 610,719, both filed Sept. 5, 1975 and 627,424 filed Oct. 30, 1975, and 671,764, filed Mar. 30, 1976. All of these applications are assigned to the assignee of this application.

Field of the Invention

This application relates to valve disablement and more specifically to an improved valve disabler selectively operative to enable and disable a valve for an engine.

Description of the Prior Art

The concept of deactivating selected cylinders of an engine by disabling the valves associated with the selected cylinders is old. When this concept is applied to an Otto Cycle Engine, pumping and throttling losses are reduced, thereby improving engine efficiency during part throttle operation. The above mentioned U.S. patent applications disclose valve disablers and/or controls for valve disablers which are simple and inexpensive and which overcome many of the disadvantages of the prior art valve disablers. This application discloses further improvements of the valve disablers and controls of the mentioned applications.

SUMMARY OF THE INVENTION

An object of this invention is to provide a simple, low cost, and self-contained valve disabler for a valve selector assembly.

According to an important feature of this invention the valve disabler is a self-contained spring capsule subassembly adapted to be supported by a stud of an internal combustion engine of the type having a rocker arm which normally pivots about a fixed fulcrum. The spring capsule includes a sleeve adapted to be slideably supported by the stud, a fulcrum means defined by one end of the sleeve and slideable therewith, cap means slideably connected to the other end of the sleeve, and a spring reacting against the cap and biasing the fulcrum into engagement with the rocker arm. The selector assembly includes control means selectively moveable between a valve enabling position preventing sliding movement of the sleeve and fulcrum and a valve disabling position allowing sliding movement of the sleeve and fulcrum.

BRIEF DESCRIPTION OF THE DRAWINGS

The preferred embodiment of the invention is shown in the accompanying drawings in which:

FIG. 1 is a downward looking view of a valve selector assembly with the assembly in a valve enabling position;

FIG. 2 is an elevation view of the valve selector assembly, looking in the direction of arrow 2 in FIG. 1;

FIG. 3 is an end elevation view of the valve selector assembly of FIG. 1, looking in the direction of arrows 3—3 in FIG. 1;

Figure 4:
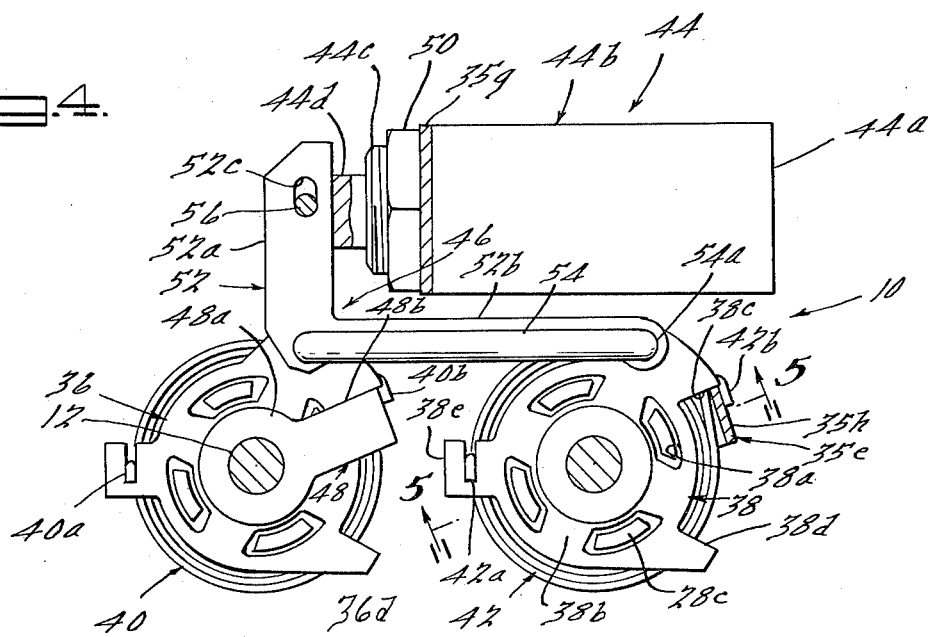
FIG. 4 is a downward looking view of the valve selector assembly of FIG. 1 with a bridge plate removed and with the assembly in a valve disabling position.

The valve selector assembly is described for use in an internal combustion engine environment and the description includes certain terminology referring to direction and motion. This environment and terminology is for convenience in describing the selector assembly and should not be considered limiting unless the claims are explicitly so limited.

DETAILED DESCRIPTION OF THE DRAWINGS

FIGS. 1 and 2 illustrate a valve selector assembly 10 as it would appear when installed on an engine. The selector assembly is supported by studs 12 and 14 which may be pressed or threaded into a valve head structure partially shown at 16. The selector assembly includes two valve disablers 18 and 20 and a control means 22 which are assembled as a complete unit ready to be slipped over the studs and secured by nuts 24 and 26.

Disablers 18 and 20 are identical in structure and function; therefore a detailed description of one will suffice for both. Looking now at FIGS. 2 and 3, disabler 20 is a spring capsule subassembly of the selector assembly and is comprised of a sleeve 28 defining a fulcrum 28a at its lower end, a cap 30 slideably retained on the sleeve by a snap ring 32, and a helical spring 34 compressed between the cap and the fulcrum. An opening 28b in fulcrum 28a slideably receives stud 14. Sleeve 28 defines, at its upper end, a set of four axially extending teeth 28c separated by spaces 28d. Cap 30 includes a flat plate portion 30a, a cylindrical skirt portion 30b, and a radially inwardly extending flange portion 30c contacting snap ring 32 and defining an opening slideably receiving the sleeve. Flat plate portion 30a includes a set of four circumferentially arrayed arcuate openings 30d (see FIG. 5) which are in constant slideable receipt of teeth 28c, thereby preventing rotation of cap 30 relative to sleeve 28. Skirt portion 30b includes four equally spaced openings 30e, one of which cooperates with control means 22 to prevent rotation of the disablers relative to stud 14. Flange portion 30c and snap ring 32 define a stop for arresting the force of spring 34 and limiting the maximum extension of the spring capsule. Fulcrum 28a may be separate from sleeve 28, in which case the sleeve would have a flange at the end adjacent to the fulcrum for retaining spring 34.

It is an important requirement that teeth 28c be flush with the upper surface of flat plate portion 30a. The capsule form of disabler 20 allows this requirement to be simply and inexpensively met by merely machining or grinding the upper surface of flat plate 30a to remove excess plate thickness or teeth projecting beyond the plate.

Looking now at FIGS. 1 and 2, the control means includes a bridge plate 35, two rotatable latch plates 36 and 38, two torsion springs 40 and 42, an actuator 44, a linkage assembly 46, and an adjustable stop 48. Adjustable stop 48 is not seen in FIG. 1 and is best seen in FIGS. 2 and 4.

Figure 5:
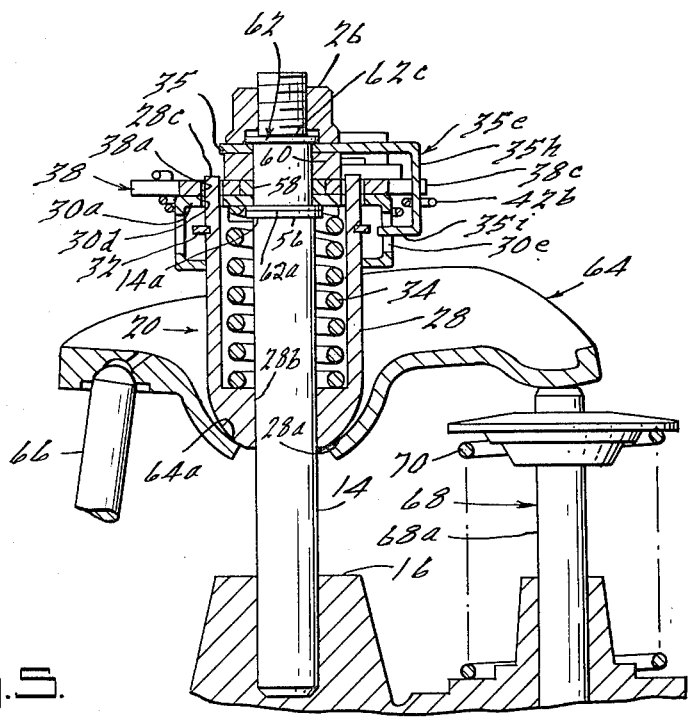
FIG. 5 is an end elevation view of the valve selector assembly of FIG. 4, looking in the direction of arrows 5—5 in FIG. 4.

Bridge plate 35, as seen in FIGS. 1-3 and in particular FIG. 3, includes a flat portion 35a having holes therein for receiving studs 12 and 14, a raised portion 35b, portions 35c and 35d for supporting actuator 44, and a fixed stop 35e (stop 35e is not shown in FIG. 3). The hole for receiving stud 12 is elongated to allow for small variations in the center-to-center spacing of the studs. Portion 35c is bent into a semicircle shape and supports end 44a of the actuator housing 44b. Portion 35d includes a horizontally extending portion 35f and a vertically extending tab portion 35g having an opening therein large enough to receive a threaded portion 44c of actuator housing 44b. A nut 50 secures the housing to tab portion 35g. Fixed stop 35e, as best seen in FIGS. 2 and 5, is U shaped and includes a vertically extending portion 35h and horizontally extending portion 35i. Portion 35i is snugly received by one of the openings in the skirt portion of cap 30, whereby disabler 20 is secured against rotation relative to stud 14 and whereby teeth 28c defined by sleeve 28 are oriented with respect to fixed stop 35e.

Latch plates 36 and 38 are identical in structure and function and are best seen in FIG. 4. The latch plates are shown in the valve enabling position in FIGS. 1–3 and in the valve disabling position in FIGS. 4 and 5.

Latch plate 38 includes four circumferentially arrayed arcuate openings 38a which align with arcuate openings 30d in cap 30 and teeth 28c when the latch plate is in its valve disabling position, four spoke portions 38b separating openings 38a and providing abutting surfaces which align with and contact teeth 28c when the latch plate is in the valve enabling position, disabling and enabling stops 38c and 38d which contact opposite sides of vertically extending portion 35h of the fixed stop for orienting openings 38a of the latch plate with respect to teeth 28c, and a slotted extension 38e.

Torsion springs 40 and 42, respectively, bias latch plates 36 and 38 to their valve enabling positions, as shown in FIGS. 1–3. Torsion springs 40 and 42 are identical in structure and function. Spring 42 wraps skirt portion 30b about one and a half times and has hooks 42a and 42b which are, respectively, secured to slotted extension 38e and vertically extending portion 35h of the fixed stop.

Actuator 44, as best seen in FIGS. 1 and 4, is of the solenoid type and includes a plunger 44d and the housing portion containing a coil of wires. The left end of the plunger, which is shown partially broken away in FIGS. 1 and 4, is slotted and drilled for connection to linkage assembly 46. The plunger is shown in its unactuated position in FIGS. 1–3 and in its actuated position in FIGS. 4 and 5. The unactuated and actuated positions correspond respective to the valve enabling and disabling positions of the latches.

Linkage assembly 46, as best seen in FIG. 4, includes an L shaped member 52 having an upwardly extending portion 52a and a horizontally extending portion 52b which is pivotally connected to latch plates 36 and 38 by a rod 54 having bent ends extending through unshown holes in the ends of the horizontally extending portion and through a hole in each of the latch plates. A bent end 54a of rod 54 may be seen in FIG. 3. Rod 54 is retained in place by raised portion 35b of the bridge plate. Upwardly extending portion 52a is received by the slot in plunger 44d and is slideably secured to the plunger via a pin 56 and an elongated opening 52c in the portion 52a.

Looking now at FIGS. 2 and 4, adjustable stop 48 includes a collar portion 48a which loosely receives stud 12, a first horizontally extending portion 48b, a vertically extending portion 48c, and a second horizontally extending portion 48d. The second horizontally extending portion 48d is snugly received in one of the openings in the cap skirt portion of disabler 18, whereby disabler 18 is oriented with respect to the adjustable stop in a manner analogous to the way disabler 20 is oriented with respect to the fixed stop. Adjustable stop 48 is biased toward stop 36d of latch plate 36 by torsion spring 40 and fixed against rotation when nut 24 is tightened.

The described arrangement of stops, latches, torsion springs, and linkage means automatically orients the disabler controls with respect to the actuator and with respect to the disabler. Hence, a selector assembly consisting of disablers 18 and 20 and control means 22 may be placed on studs 12 and 14 and secured by nuts 24 and 26 without need or meticulous and time consuming adjustment.

Referring now to FIGS. 3 and 5, latch plate 38 of disabler 20 is sandwiched between a stackup of parts, which parts are secured against rotational and axial movement by a shoulder 14a defined by stud 14 and nut 26. This stackup of parts includes a washer 56, flat plate portion 30a of cap 30, a washer 58 which is a few thousandths of an inch thicker than latchplate 38, a washer 60, and bridge plate portion 35a. The stackup is held together prior to installation on stud 14 by an eyelet 62. Eyelet 62 includes a flange portion 62a sandwiched between washer 56 and flat plate portion 30, a cylinder portion 62b, and a flange portion 62c.

Latch plate 36 of disabler 18 is sandwiched between a stackup of parts which are secured against rotational and axial movement in the same manner. This stackup, which is not shown in section, also includes the thickness of collar 48a of the adjustable stop. The heights of both stackups is maintained at the same height by reducing the thickness of a washer 61 in the stackup associated with disabler 18.

Eyelet 60 and an equivalent eyelet associated with disabler 18 provide means for holding the stackups together and assembling the disablers and control means as a complete assembly ready to be slipped over studs 12 and 14 and secured by nuts 24 and 26 without adjustment.

FIGS. 3 and 5 illustrate portions of a valve drive train for an engine. The illustrated portions include a rocker arm 64 having a pivot surface 64in contact with fulcrum 28a, a push rod 66, and a valve stem 68a of a partially shown poppet valve 68 which is biased closed by a spring 70. The fulcrum defined by valve disabler 18 is associated with a rocker arm 72 in the same manner.

Operation

Control means 22 is normally biased toward the valve enabling position by the force of torsion springs 40 and 42 and is biased toward the valve disabling position by the electromagnetic force of solenoid actuator 44. These forces are effective to rotate latch plates 36 and 38 only when both of the valves associated with the rocker arms 64 and 70 are inactive, i.e., the forces are ineffective to overcome the upwardly directed force on the disabler sleeves when the valves are open.

When the control means is in the valve enabling position the teeth defined by the sleeves of the valve disablers abut the spoke portions of the latch plates, thereby sliding movement of the fulcrum is prevented and whereby the rocker arms pivot about the fulcrums in a normal manner to open and close the valves in response to movement of the push rods. When the control means is in the valve disabling position the teeth align with the arcuate openings in the latch plates, whereby the disabler sleeves and fulcrums slide upward against the resilient forces to the springs in the disabler sleeves and whereby the rocker arms pivot about the valve stem ends in response to movement of the pushrods.

The resilient forces provided by the springs in the valve disablers should be great enough to prevent clashing of valve drive train components and if hydraulic adjusters are used in the valve drive train the spring forces should be great enough to prevent ballooning of the hydraulic adjusters.

A preferred embodiment of the valve selector assembly has been disclosed. Many variations and modifications of the preferred embodiment are beleived to be within spirit of the invention in the selector assembly. The following claims are intended to cover the inventive portions of the spring capsule valve disabler and modifications believed to be within the spirit of the invention therein.

What is claimed is:

1. An improved valve disabler for a valve selector assembly (adapted to be secured to a rocker arm stud of an internal combustion engine having a rocker arm which normally pivots about a fixed fulcrum means to open and close an engine valve) the selector assembly includes a control means selectively moveable between a valve enabling position preventing movement of the fulcrum means and valve disabling position allowing movement of the fulcrum means; said improved valve disabler comprising:
   sleeve means having said fulcrum means disposed at one end thereof, said sleeve and fulcrum means adapted to be slideably supported by said stud, and said sleeve means and fulcrum means fixed against sliding movement when said control means is in the valve enabling position and allowed to slide along the axis of said stud when said control means is in the valve disabling position;
   cap means slideably connected to the other end of said sleeve means; and
   spring means reacting between said one end of said sleeve and said cap means for biasing said fulcrum means into engagement with said rocker arm and defining a spring capsule subassembly for said selector assembly.

2. The improved valve disabler of claim 1 further including:
   means for preventing relative rotation between said sleeve means and said cap means.

3. The improved valve disabler of claim 2 further including:
   means connecting said cap to said control means for preventing rotation of said cap relative to said stud.

4. The improved valve disabler of claim 1 further including:
   a set of teeth defined by the other end of said sleeve means; and
   a set of openings in said cap means in constant slideable receipt of said teeth, thereby allowing sliding movement of said sleeve relative to said cap and preventing rotational movement of said sleeve relative to said cap.

5. The improved valve disabler of claim 1, wherein said control means includes a latch means operative, when in a valve enabling position, to prevent sliding movement of said sleeve and cap means relative to said stud and operative, when in a valve disabling position, to allow sliding movement of said sleeve relative to said stud and cap means.

6. The improved valve disabler of claim 5, wherein said control means includes stop means defining at least one of said latch means positions, and wherein said improved valve disabler further includes:
   means for preventing relative rotation between said sleeve means and said cap means; and
   means preventing movement of said cap relative to said stop means for orienting said sleeve and cap relative to said stop means.

7. An improved valve disabler for a valve selector assembly adapted to be secured to a rocker arm stud of an internal combustion engine having a rocker arm which normally pivots about a fixed fulcrum means to open and close an engine valve, the selector assembly includes control means having latch means selectively moveable between a valve enabling position preventing movement of said fulcrum means and a valve disabling position allowing movement of said fulcrum means, said control means also including stop means defining at least one of said latch means positions, said improved valve disabler comprising:
   sleeve means having said fulcrum means disposed at one end thereof, said sleeve and fulcrum means adapted to be slideably supported by said stud, and said sleeve and fulcrum means fixed against sliding movement when said latch means is in the valve enabling position and allowed to slide along the axis of said stud when said latch means is in the valve disabling position;
   cap means slideably connected to the other end of said sleeve means;
   spring means reacting between said one end of sleeve means and said cap means for biasing said fulcrum means into engagement with said rocker arm and defining a spring capsule;
   means for preventing relative rotation between said sleeve and cap means about said stud, and
   means for preventing movement of said cap means relative to said stop means and for orienting said sleeve and cap means relative to said stop means.

8. The improved valve disabler of claim 7, wherein said means for preventing relative rotation includes:
   a set of teeth defined by the other end of said sleeve means; and
   a set of openings in said cap means in constant slideable receipt of said teeth.

9. The improved valve disabler of claim 7, wherein:
   said cap means includes a flat plate portion transverse to the axis of said sleeve and stud, a skirt portion concentric to a portion of said sleeve means, and a radially inwardly extending flange portion defining an opening slideably receiving said sleeve means; and
   means carried by said sleeve means and contacting said flange portion for arresting the spring force biasing said fulcrum toward said rocker arm and defining the maximum extension of said spring capsule.

10. The improved valve disabler of claim 9 wherein said means for preventing relative rotation includes:
   a set of teeth defined by the other end of said sleeve means; and
   a set of openings defined by said flat plate portion and in constant slideable receipt of said teeth.

11. The improved valve disabler of claim 9, wherein said means for preventing movement of said cap means includes:

an opening in said skirt portion for receiving an extension of said stop means.

12. The improved valve disabler of claim 9, wherein said latch means is a latch plate juxtaposed said flat plate portion and moveable in a plane parallel to said flat plate portion, and wherein said control means further includes means for preventing movement of said flat plate portion and said latch plate along the axis of said stud.

13. The improved valve disabler of claim 12, wherein said latch plate includes a set of abutting surfaces and a set of openings, and wherein said means for preventing relative rotation between said sleeve and cap means includes:
- a set of teeth defined by the other end of said sleeve means; and
- a set of openings defined by said plate portion and in constant slideable receipt of said teeth, whereby said abutting surfaces align with said teeth to prevent sliding movement of said sleeve when said latch plate is in the valve enabling position and said latch plate openings align with said teeth to allow sliding movement of said sleeve when said latch plate is in the valve disabling position.

14. An improved valve disabler for a valve selector assembly adapted to be secured to a rocker arm stud of an internal combustion engine having a rocker arm which normally pivots about a fixed fulcrum means to open and close an engine valve, the selector assembly includes a control means having a latch plate moveable between a valve enabling position and a valve disabling position in a plane transverse to said stud and retained against movement in the direction of the axis of said stud, said plate having a set of abutting surfaces and a set of openings, said improved valve disabler comprising:
- sleeve means having said fulcrum disposed at one end thereof and a set of teeth at the other end, said sleeve and fulcrum means adapted to be slideably supported on said stud;
- cap means including a flat plate portion transverse to the axis of said stud and sleeve means and juxtaposed said latch plate, said flat plate portion including a set of openings in constant slideable receipt of said teeth, whereby said abutting surfaces align with said teeth to prevent sliding movement of said sleeve when said latch plate is in the valve enabling position and said latch plate openings align with said teeth to allow sliding movement of said sleeve when said latch plate is in the valve disabling position;
- means slideably connecting said cap means to said sleeve means for defining a telescoping capsule having a maximum extension limited by said means slideably connecting; and
- spring means reacting between said one end of said sleeve means and said cap means for biasing said fulcrum means into engagement with said rocker arm.

15. The improved valve disabler of claim 14, wherein said control means includes stop means for defining at least one of said latch plate positions, and wherein said improved valve disabler includes:
- means cooperating with the control means for orienting said teeth relative to said stop means.

* * * * *